Sept. 25, 1934.   H. F. FISHER   1,974,451
NON-SHORT-CIRCUITING TREATER
Filed March 16, 1931
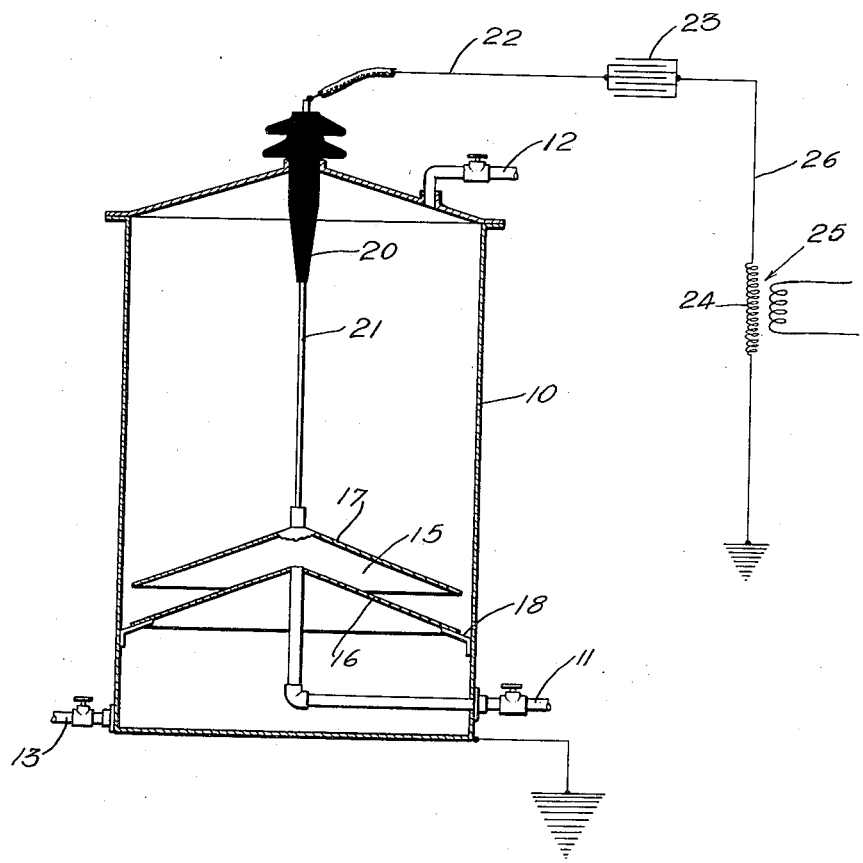
INVENTOR:
Harmon F. Fisher.
By
ATTORNEY.

Patented Sept. 25, 1934

1,974,451

UNITED STATES PATENT OFFICE 1,974,451

NON-SHORT-CIRCUITING TREATER

Harmon F. Fisher, Long Beach, Calif., assignor to Petroleum Rectifying Company of California, Los Angeles, Calif., a corporation of California Application March 16, 1931, Serial No. 522,897

2 Claims. (Cl. 204—24)

My invention relates to a novel method and apparatus for electrically treating an emulsion or other fluid.

One type of fluid which is especially susceptible to treatment by my invention is the usual petroleum emulsion which exists either in the underlying strata penetrated by an oil-well or which is formed during the raising of the oil to the surface of the ground. This emulsion is usually of the water-in-oil type, the water phase being in the form of minute droplets suspended in the continuous oil phase. Before this oil can be sold commercially, it is necessary to reduce the water content to a very low value.

Various methods of accomplishing this result have been used, one of the most important being the electrical method wherein the emulsion is subjected to a high intensity electric field formed between a pair of electrodes. Difficulty is often experienced when treating an emulsion having a high water content, for the water particles tend to chain up and short-circuit the electrodes, thus making it impossible to maintain the field and consequently preventing the agglomeration of water particles which would otherwise take place.

It is a primary object of the present invention to provide an improved method and apparatus for treating an emulsion or other fluid without danger of short-circuiting chains decreasing the voltage across the treating space to such an extent that treatment is not effected.

Another object of the invention is to provide a novel method and apparatus for subjecting a fluid to an electric field, the intensity of this field varying as the treatment continues, this variation being, in the preferred embodiment, a change in potential substantially proportional to the electrical resistance of the field, so that as treatment progresses the potential across the electrodes increases.

Extensive experiments have been carried out with the end in view of treating the emulsion by a substantially perfect electrostatic field wherein no ordinarily appreciable current flow through the emulsion takes place. It appears, however, that such a system is incapable of commercially treating such a petroleum emulsion, and that a certain amount of "treating current" passing through the emulsion appears to be necessary. Thus, if a pair of electrodes are coated with a dielectric material which in turn contacts the emulsion to be treated, the agglomerating action on the water particles is practically nil and the treating current is negligible unless extremely high potential is resorted to. The necessary treating current to effect agglomeration is, however, extremely minute under proper conditions.

Another object of the invention is to provide a novel system of treatment in which the treating current passing through the fluid is extremely minute, usually in the neighborhood of a few milliamperes down to a fraction of a milliampere.

This current cannot, however, be made too small, for my experiments have shown that a certain minimum of current is desirable, this current materially assisting in the breaking up of any short-circuiting chains that may tend to form. If reduced below this minimum there is a sharp decrease in the tendency to disrupt these chains.

The combination which I find very effective in treating such an emulsion includes a pair of electrodes and a source of alternating potential in circuit therewith, this circuit also including a condenser means through which the treating current must pass. This condenser means serves not only to limit the charging current, but also acts as a control means inasmuch as it varies the potential impressed across the electrodes as a function of the electrical resistance therebetween.

It is an object of this invention to provide a treater, the electrodes of which are energized by a circuit including a source of alternating potential and a condenser means.

Further objects and advantages of the invention will be made evident hereinafter.

One form of apparatus is diagrammatically illustrated in the drawing in which the numeral 10 represents a tank to which the emulsion or other fluid is supplied through a pipe 11, the dry oil being withdrawn from the top of the tank through a pipe 12 and the water being withdrawn through a pipe 13 communicating with the lower end of the tank. The pipe 11 preferably directly communicates with a treating space 15 formed between the adjacent surfaces of primary and secondary electrodes 16 and 17. The primary electrode is preferably connected to the tank 10 by brackets 18 in the usual manner and the secondary electrode is insulated from the tank 10 by an insulator bushing 20 through which a conductor rod 21 extends, the lower end of this rod being connected to the secondary electrode 17 in supporting relationship and the upper end extending through the insulator bushing 20 and being connected to a conductor 22.

The usual method of setting up the electric field between the electrodes is to connect a source of high potential directly across these electrodes. In the present invention, however, a condenser means 23 is positioned between the source and one of the electrodes. In the drawing I have shown the conductor 22 as being connected to one terminal of this condenser means, the other terminal being connected to one terminal of a secondary winding 24 of a transformer 25 by means of a conductor 26. The remaining terminal of the secondary 24 is connected to the tank 10, this connection usually being made through ground, as indicated in the drawing, although a direct connection between this terminal of the secondary and the tank 10 may be substituted.

The transformer 25 is of the usual high voltage type, but is preferably capable of delivering a somewhat higher voltage than transformers at present used in the dehydrator art, which transformers are usually rated at from 10,000 to 30,000 volts. No absolute values can be given for this voltage, but the use of voltages higher than standard practice is desirable in view of the potential drop across the condenser means 23.

The condenser means may be of any one of a number of well-known types. I have successfully used a mica-insulated condenser, and certain condensers formed of glass-plates suitably insulated with transformer oil, as well as other types capable of withstanding the high potentials impressed thereacross. In other instances, it is possible and desirable to incorporate this condenser means in one of the electrodes, one important factor being that this condenser should preferably be capable of withstanding the peak voltage of the transformer without danger of breakdown. The capacity of this condenser may be varied over wide limits to control the treating current passing between the electrodes. By utilizing a condenser of high capacity, this treating current is greater than when a condenser of low capacity is utilized.

The desirable effects arising from the use of this system of treating may be best set forth by considering a practical example. Considering the treating space 15 as being filled with the usual Signal Hill crude oil emulsion, the charging current passing through this emulsion will be equal to the output voltage of the transformer 25 divided by the impedance of the circuit connected thereto, this circuit including the condenser means 23 and the material in the treating space 15. If the impedance of the condenser means 23 is equal to the impedance of the emulsion in the treating space 15, the output voltage of the transformer will be substantially equally divided between the treating space and the condenser means. However, should the water content of the emulsion in the treating space 15 be larger, the electrical resistance between the electrode surfaces will be correspondingly smaller, and the potential of the transformer will not be equally divided between the condenser means and the electrodes. In fact, if the impedance of the fluid in the treating space is one-fourth that of the impedance of the condenser means, the latter will absorb 80% of this output voltage and only 20% will be impressed across the electrodes 16 and 17. Thus, when the wet emulsion first enters the treating space, the potential across this space is much lower than it is after a certain amount of the water has separated from the emulsion, thus leaving a drier oil in the treating space and thus increasing the electrical resistance of the fluid in the treating space.

It should be clear, however, that the condenser 23 limits the treating current which passes through the emulsion in the treating space. In fact, this treating current is preferably limited to such a degree that it will not register on the ordinary ammeters used in the dehydration art. I have successfully treated emulsions when this treating current would not register on a small-range sensitive milliammeter placed in the conductor 22, and when using a condenser means 23, this treating current seldom rises above a fraction of a milliammeter.

It is desirable, however, that this treating current be maintained large enough to disrupt any short-circuiting chains which might form in the treating space in a manner to completely short-circuit the electrodes. Experiments definitely indicate that these chains are more readily broken if a small treating current is maintained therethrough than if the current is entirely removed and subsequently reformed. The condenser means 23 automatically limits this treating current and insures that a small current flow takes place through the treating space even though the electrodes are completely short-circuited by the short-circuiting chains. Due to the fact that this current is extremely minute no difficulty is encountered with heavy surges of current which heretofore took place when these water particles lined up to form short-circuiting chains, and with the present system it is possible to dispense with the elaborate system of circuit breakers heretofore necessary.

If a condenser is used in thus limiting the current the inherent storage capacity thereof allows electricity to be stored therein and discharges only during transient conditions in the field and at such a time as these discharges are effective in breaking down short-circuiting chains.

The varying potential which is impressed between the electrodes 16 and 17 when the treating space is filled with fluid of varying resistance is a very important feature of the present invention, and especially the automatic reduction of this potential when the resistance of the fluid becomes less and tends to short-circuit the electrodes. However, experiments have shown that at no time are the electrodes 16 and 17 so completely short-circuited that no potential difference exists therebetween, and the treating current controlled in amount by the condenser means 23 is very effective in disrupting any short-circuiting chains.

It should be furthermore clear that I am not limited to the particular placement of the condenser means shown in the drawing. This condenser means would be equally advantageous if positioned in the ground circuit of the transformer or tank 10. As mentioned above, it is often desirable to build this condenser integral with one of the electrodes. However, in the latter event, I have found it necessary to always provide electrode surfaces which are conducting, so that the emulsion in the treating space 15 is in contact with electrode surfaces capable of carrying current.

I claim as my invention:

1. In an electric treater for treating emulsions, the combination of: primary and secondary electrodes defining a treating space in which is positioned the emulsion to be treated; a source of high-potential alternating current providing a pair of terminals; conducting means for electrically connecting one of said terminals to said primary electrode; and a condenser means forming an exclusive connection between the other of said terminals and said secondary electrode and having a break-down valve higher than the potential impressed thereacross by said source of alternating current should said electrodes become short-circuited, whereby said source of alternating current, said conducting means, and said condenser means are connected in a series circuit with said electrodes, the current through said series circuit being limited only by the impedance of said source, said condenser, said conducting means, and the impedance of said treating space.

2. In an electric treater, the combination of: primary and secondary electrodes insulated from each other and defining a treating space in which is positioned the emulsion to be treated; a source of high-potential alternating current for sending current through said emulsion in said treating space; and condenser means in series circuit with said source of current and said electrodes and carrying all of the current reaching said electrodes and itself limiting said current flowing through said emulsion between limits comprising a maximum limit of a few milliamperes and a minimum limit of a fraction of a milliampere, said condenser means including a dielectric medium of sufficient dielectric strength to withstand any potential impressed thereacross by said source of high-potential alternating current.

HARMON F. FISHER.